United States Patent [19]

Kawaguchi et al.

[11] Patent Number: 4,514,357

[45] Date of Patent: Apr. 30, 1985

[54] PRODUCTION OF MOLDED ARTICLES HAVING EXCELLENT OPTICAL CHARACTERISTICS

[75] Inventors: Yoshikazu Kawaguchi; Seiichro Maruyama; Hiroyuki Kawasaki, all of Kitakyushu, Japan

[73] Assignee: Mitsubishi Chemical Industries, Limited, Tokyo, Japan

[21] Appl. No.: 450,039

[22] Filed: Dec. 15, 1982

[30] Foreign Application Priority Data

Jan. 22, 1982 [JP] Japan .................................. 57-8315

[51] Int. Cl.³ .......................... B29F 1/08; B29D 11/00
[52] U.S. Cl. ................................ 264/328.16; 264/1.1; 264/106; 264/328.14; 264/328.17; 524/611
[58] Field of Search .................... 264/1.1, 2.2, 328.14, 264/328.16, 328.17, 106, 1.3; 524/147, 151, 153, 611

[56] References Cited

U.S. PATENT DOCUMENTS

| 3,305,520 | 2/1967 | Fritz et al. | 524/147 |
|---|---|---|---|
| 3,763,063 | 10/1973 | Factor | 524/153 |
| 4,008,031 | 2/1977 | Weber | 264/2.2 |
| 4,076,686 | 2/1978 | Calkins | 524/147 |
| 4,197,384 | 4/1980 | Bialous et al. | 524/151 |
| 4,254,065 | 3/1981 | Ratkowski | 425/808 |
| 4,276,233 | 6/1981 | Markezich et al. | 524/147 |
| 4,284,591 | 8/1981 | Neefe | 264/1.1 |
| 4,364,878 | 12/1982 | Laliberte | 264/2.2 |

FOREIGN PATENT DOCUMENTS 51-20259   2/1976   Japan .................................. 264/2.2

Primary Examiner—James Lowe
Attorney, Agent, or Firm—Oblon, Fisher, Spivak, McClelland & Maier

[57] ABSTRACT

A molded article having excellent optical characteristics and obtained by injection molding a resin composition of a bis(hydroxyphenyl)alkane polycarbonate resin having an average molecular weight of 12000 to 18000 and containing 0.005 to 0.5 wt %, based on the resin, of a phosphorous ester represented by the general formula,

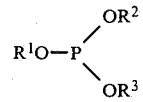

wherein $R^1$ and $R^2$ independently represent an alkyl or aryl group, and $R^3$ represents hydrogen, an alkyl or aryl group, at a resin temperature of 330° to 400° C. and at a mold temperature of 50° to 110° C., and a method for producing such articles.

5 Claims, No Drawings

PRODUCTION OF MOLDED ARTICLES HAVING EXCELLENT OPTICAL CHARACTERISTICS

BACKGROUND OF THE INVENTION

1. Field of the Invention

This invention relates to molded articles having excellent optical characteristics. More particularly, it relates to molded articles having excellent transparency and a reduced degree of optical strain and also to a method for producing such molded articles.

2. Description of the Prior Art

Molded articles used for optical purposes in the form of, for example, plates, sheets, boxes, blocks or other various shapes should not only be transparent, but also have a reduced degree of optical strain. Especially, digital signal recording discs such as digital audio discs, digital video discs and signal recording discs for electronic computers should have excellent transparency and small optical strain. For instance, for digital audio discs having a thickness of 1.2 mm and a diameter of 120 mm, the retardation is needed to be not more than 60 m$\mu$, preferably not more than 40 m$\mu$. In addition, the warpage should be so small that for the digital audio disc, it is needed to be not more than 0.2 mm, preferably not more than 0.1 mm.

The manufacture of these molded articles is conveniently effected by molding polycarbonate resins with excellent transparency by the injection molding technique. However, in order to obtain moldings having a reduced degree of optical strain, it is necessary to permit the resin to flow smoothly at the time of the injection molding so that the flow of the resin melt does not cause optical unevenness.

The good flow of the resin melt may be attained by a method in which the injection molding is effected at high resin temperatures. However, high resin temperatures are disadvantageous in that the resin may be colored or yellowed such as by decomposition of the resin, impeding the transparency of the resultant molding. Alternatively, polycarbonate resins having low molecular weights may be used. However, such polycarbonate resins, e.g. polycarbonate resins having an average molecular weight less than 12000, considerably lower in molecular weight when injection molded, leading to the disadvantage in that their mechanical properties greatly lower and the resultant molding will break upon release of the molding.

We have made the intensive study on a method for obtaining resin moldings having excellent transparency and a small degree of optical strain and found that polycarbonate resins which contain a phosphorous ester and have a certain range of average molecular weights exhibit excellent melt flowability and excellent heat stability. These resins can provide transparent molding which are less strained optically when injection molded under certain conditions.

SUMMARY OF THE INVENTION

It is accordingly an object of the invention to provide moldings having excellent optical characteristics.

The above object can be achieved by a molded article or molding obtained by injection molding at a resin temperature of 330°–400° C. and at a mold temperature of 50°–110° C. a resin composition of a bis(hydroxyphenyl)alkane polycarbonate resin having an average molecular weight of 12000 to 18000 and containing 0.005 to 0.5 wt %, based on the resin, of a phosphorous ester represented by the general formula

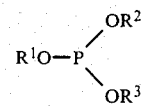

wherein $R^1$ and $R^2$ independently represent an alkyl or aryl group, and $R^3$ represents hydrogen, an alkyl, or aryl group.

DETAILED DESCRIPTION OF THE PREFERRED EMBODIMENTS

The present invention is described in more detail.

The bis(hydroxyphenyl)alkane polycarbonate resins used in the present invention are those which have an average molecular weight of 12000 to 18000 and are obtained by reacting bis(hydroxyphenyl)alkanes and a carbonate such as phosgene or diphenyl carbonate. The average molecular weight is calculated from $\eta sp$, which was measured at 20° C. using a methylene chloride solution of 6.0 g/l of the polycarbonate resin, according to the following formulae $$\eta sp/C = [\eta](1 + K'\eta sp)$$

wherein C represents a concentration of the polycarbonate resin (g/l), $[\eta]$ is an intrinsic viscosity, and $K'$ is a constant of 0.28, and $$[\eta] = KM^\alpha$$

wherein K is a constant of $1.23 \times 10^{-5}$, M is an average molecular weight, and $\alpha$ is a value of 0.83. The average molecular weight is usually controlled by adding a short stopper such as phenol, p-tertiary butylphenol or the like at the production of the polycarbonate resin.

Examples of the bis(hydroxyaryl)alkanes include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(hydroxyphenyl)octane and the like. Additionally, within a range not impeding the physical properties of the resulting molded articles such as discs, other compounds may be used in admixture with the above-mentioned alkanes. These other compounds include, for example, bis(hydroxyaryl)cycloalkanes such as 1,1-bis(4-hydroxyphenyl)cyclohexane, dihydroxydiphenyl ethers such as 4,4'-dihydroxydiphenyl ether, dihydroxydiphenylsulfides such as 4,4'-dihydroxydiphenylsulfide, dihydroxydiphenylsulfoxides such as 4,4'-dihydroxydiphenylsulfoxide, dihydroxydiphenylsulfones such as 4,4'-dihydroxydiphenylsulfone, and the like. Of these polycarbonate resins, a polycarbonate resin which is prepared from 2,2-bis(4-hydroxyphenyl)propane(bisphenol A) is preferred.

The polycarbonate resins should have an average molecular weight of 12,000 to 18,000, preferably 13,000 to 17,500. Too high average molecular weights are disadvantageous in that in order to make molded articles having a reduced degree of optical strain, the molding has to be effected at a resin temperature exceeding 400° C., involving decomposition of the resin at such high temperatures.

As a consequence, the resulting molded articles will have silver streaks on the surface thereof or undergo coloration. On the other hand, too low average molecular weights make it possible to suppress the optical strain to a substantial extent, but the molecular weight of the resin lowers so considerably at the time of the molding that the physical properties of the resin deteriorate and thus the resulting molding tends to break upon release from a mold. Even though moldings are obtained, their mechanical strengths are unfavorably low.

The phosphorous esters used in the practice of this invention are diesters or triesters obtained from phosphorous acid and alcohols or phenols. In the aforeindicated general formula, examples of $R^1$ and $R^2$ are respectively, an alkyl group such as butyl, hexyl, octyl, 2-ethylhexyl, nonyl, decyl, dodecyl, octadecyl, pentaerythrityl, cyclohexyl and the like, and an aryl group such as phenyl, tolyl, nonylphenyl and the like. $R^3$ represents hydrogen, or the above-mentioned alkyl or aryl groups.

Examples of the phosphorous esters include tributyl phosphite, tris(2-ethylhexyl)phosphite, tridecyl phosphite, tristearyl phosphite, triphenyl phosphite, tricresyl phosphite, tris(nonylphenyl) phosphite, 2-ethylhexyldiphenyl phosphite, decyldiphenyl phosphite, phenyldi-2-ethylhexyl phosphite, phenyldidecyl phosphite, tricyclohexyl phosphite, distearylpentaerythrityl diphosphite, diphenylpentaerythrityl disphosphite, and the like.

The amount of the phosphorous esters is in the range of 0.005 to 0.5 wt %, preferably about 0.01 to 0.2 wt %, of the polycarbonate resin. Too small amounts of the phosphorous ester lead to the disadvantage that the coloration and deterioration in transparency caused by decomposition of the resin cannot be suppressed. On the contrary, too large amounts lead to decomposition of phosphorous esters themselves, causing silver streaks to be formed on the surface of molded articles.

The phosphorous ester can be incorporated in a polycarbonate resin by a variety of methods as usually employed for preparation of ordinary resin compositions. The methods include a dry blending of both ingredients, a melt mixing of the blend using an extruded, etc., and a method in which master pellets containing a larger amount of phosphorous esters are first prepared and then admixed with polycarbonate resin pellets.

In the practice of the invention, the polycarbonate resin containing a phosphorous ester in such a manner as mentioned above is injection molded at a resin temperature of 330° to 400° C. and at a mold temperature of 50° to 110° C.

During the course of the molding, too high resin temperatures should be avoided because the resin decomposes, so that coloration and silver streaks take place, resulting in poor transparency. On the contrary, too low resin temperatures are disadvantageous in that the polycarbonate resin used in the present invention does not show satisfactory melt flowability and thus moldings of low optical strains cannot be obtained. Preferable resin temperatures are approximately in the range of 335° to 390° C.

The mold temperature is generally in the range of 50° to 110° C., preferably 60° to 105° C. Higher mold temperatures are unfavorable since great deformation takes place at the time of release of the resulting molding and thus there cannot be obtained moldings having a small degree of warpage. Lower temperatures result in optically strained moldings.

In practice, the injection rate is not less than 70 ml/sec, preferably 80 to 300 ml/sec. By the injection rate is meant a rate of charging a melt into a mold. This rate is indicated herein by an amount of a melt per unit time during the course of from the start of the injection till a stage of dwelling. This amount is calculated from the product of the forward speed of a screw of an injection machine and the inner sectional area of the cylinder.

If the injection rate is too small, there cannot be obtained moldings having a small optical strain. On the contrary, too high an injection rate results in poor precision such as in thickness of moldings.

According to the method of the present invention, there can be obtained molding which are excellent in transparency and small in optical strain. Especially when digital signal recording discs are produced, they not only have such characteristics as mentioned above but also suffer little warpage; which is very convenient from the industrial viewpoint.

Having generally described the invention, a more complete understanding can be obtained by reference to certain specific examples, which are included for purposes of illustration only and are not intended to be limiting unless otherwise specified.

In examples, parts and percents are by weight unless otherwise indicated.

Physical properties were measured according to the following methods.

Retardation

Molded discs having a thickness of 1.2 mm and a diameter of 120 mm were measured at the central portion thereof by means of a polarizing microscope made by Carl Zeiss Co., Ltd. and attached with a calcite compensator and the retardation was indicated by m$\mu$.

Warpage

Discs of the same size as mentioned above were each placed on a flat plate and a height at the most warped end portion from the plate was measured by means of a coordinate measuring machine made by Mitsutoyo Co., Ltd. and indicated by mm.

Total Light Transmittance

A 3.5 ounce injection molding machine (IS 75S, made by Toshiba Machine Co., Ltd.) was used to give a 3.2 mm thick and 50 mm$\phi$ test piece under conditions of a resin temperature of 355° C. and a mold temperature of 80° C. The transmittance was measured according to the method prescribed in ASTM D 1003 using Haze Meter TC-5D made by Tokyo Denshoku Co., Ltd. and indicated by %.

Melt Flowability

A 3.5 ounce injection molding machine of the same type as used above and a 2 mm thick mold for measurement of spiral flow were used to conduct the injection molding under conditions of a resin temperature of 355° C., a mold temperature of 80° C. and an injection pressure of 850 kg/cm$^2$, and the flow length was indicated by mm.

Preparatory Example A of Polycarbonate Resin 100 parts of an aqueous solution of 13% sodium salt of bisphenol A prepared by dissolving bisphenol A in an aqueous 5% sodium hydroxide solution, 0.298 part of p-tertiary butylphenol, 2.44 parts of an aqueous 2% triethylamine solution and 539 parts of methylene chloride were mixed and agitated, followed by interfacial polymerization while feeding 56.8 parts of phosgene.

The reaction mixture was separated and the methylene chloride solution containing the resulting polycarbonate resin was washed with water, an aqueous hydrochloric acid and then water, followed by evaporating the methylene chloride to obtain polycarbonate resin with an average molecular weight of 17800.

This polycarbonate resin was admixed with 0.05% of tridecyl phosphite, 2-ethylhexyldiphenyl phosphite and tris(nonylphenyl)phosphite. The respective resin compositions had total light transmittances of 91%, 90% and 87%, and melt flowabilities of 550 mm, 540 mm and 540 mm. The phosphite-free resin had a total light transmittance of 81% and a melt flowability of 530 mm.

Preparatory Example B of Polycarbonate Resin

Preparatory Example A was repeated except that 0.347 part of p-tertiary butylphenol was used, thereby obtained a polycarbonate resin having an average molecular weight of 15500.

This polycarbonate resin was admixed with tridecyl phosphite in an amount of 0.02% and 0.15% and the resulting resin compositions had both a total light transmittance of 91% with melt flowabilities being 850 mm and 900 mm, respectively.

Furthermore, a resin composition admixed with 0.02% of tris(nonylphenyl) phosphite had a total light transmittance of 90% and a melt flowability of 820 mm.

Preparatory Example C of Polycarbonate Resin

Preparatory Example A was repeated except that 0.237 part of p-tertiary butylphenol was used, thereby obtained a polycarbonate resin having an average molecular weight of 21800.

This polycarbonate resin was admixed with 0.05% of tridecyl phosphite and the resulting resin composition had a total light transmittance of 90% and a melt flowability of 340 mm.

EXAMPLES 1-3 AND COMPARATIVE EXAMPLES 1-7

The polycarbonate resin flakes with an average molecular weight of 17800 and prepared in Preparatory Example A were admixed with phosphorous esters indicated in Table 1 and charged into a 40 mmφ extruder where they were molten and kneaded at 270° C. and extruded to give pellets. Thus, phosphorous ester-containing polycarbonate pellets having average molecular weights indicated in Table 1 were obtained.

The respective types of the pellets were charged into a 4 ounce injection molding machine (J 150S, made by Japan Steel Works, Ltd.) and molded into digital audio discs having 1.2 mm thick and 120 mm diameter at respective resin temperatures, mold temperatures and injection rate indicated in Table 1.

The resulting discs had retardations and warpages indicated in Table 1.

For comparison, phosphorous ester-free polycarbonate resin, the polycarbonate resin with an average molecular weight of 21800 prepared in Preparatory Example C, higher or lower resin temperatures or mold temperatures were used. The results are shown in Table 1 below.

EXAMPLES 4-6

The polycarbonate resin having an average molecular weight of 15500 and prepared in Preparatory Example B were admixed with tridecyl phosphite or tris(nonylphenyl)phosphite in amounts indicated in Table 2, followed by repeating the procedure of Example 1 to obtain digital audio discs.

The retardation and warpage of each of the discs are shown in Table 2.

TABLE 1

|  | Phosphorous ester | | Average molecular weight of polycarbonate | Molding condition | | | Retardation (mμ) | Warpage (mm) |
|---|---|---|---|---|---|---|---|---|
|  | Type | Amount based on polycarbonate (%) |  | Resin temperature (°C.) | Mold temperature (°C.) | Injection rate (ml/sec) |  |  |
| Example 1 | Tridecyl phosphite | 0.05 | 17200 | 385 | 80 | 110 | 30 | ≦0.10 |
| Example 2 | 2-ethylexyl-diphenyl phosphite | 0.05 | 17300 | 385 | 80 | 110 | 32 | ≦0.10 |
| Example 3 | Tris (nonyl-phenyl) phosphite | 0.05 | 17300 | 385 | 80 | 110 | 35 | 0.10 |
| Comparative Example 1 | nil | 0 | 17000 | 385 | 80 | 110 | Causing of silver streaks | 0.15 |
| Comparative Example 2 | Tridecyl phosphite | 0.05 | 17200 | 410 | 80 | 110 | Causing of silver streaks | 0.20 |
| Comparative Example 3 | Tridecyl phosphite | 0.05 | 17200 | 320 | 80 | 110 | 153 | 0.15 |
| Comparative Example 4 | Tridecyl phosphite | 0.05 | 17200 | 385 | 120 | 110 | 28 | 1.0 |
| Comparative Example 5 | Tridecyl phosphite | 0.05 | 17200 | 385 | 30 | 110 | 80 | 0.10 |
| Comparative | Tridecyl phosphite | 0.05 | 20500 | 385 | 80 | 110 | 363 | 0.15 |

TABLE 1-continued

| | Phosphorous ester | | Average molecular weight of polycarbonate | Molding condition | | | Retardation (mμ) | Warpage (mm) |
|---|---|---|---|---|---|---|---|---|
| | Type | Amount based on polycarbonate (%) | | Resin temperature (°C.) | Mold temperature (°C.) | Injection rate (ml/sec) | | |
| Example 6 | | | | | | | | |

Note:
In Comparative Example 6, the polycarbonate of preparatory Example C having an average molecular weight of 21800 was used.

TABLE 2

| | Phosphorous ester | | Average molecular weight of polycarbonate | Molding condition | | | Retardation (mμ) | Warpage (mm) |
|---|---|---|---|---|---|---|---|---|
| | Type | Amount based on polycarbonate (%) | | Resin temperature (°C.) | Mold temperature (°C.) | Injection rate (ml/sec) | | |
| Example 4 | Tridecyl phosphite | 0.15 | 14800 | 345 | 80 | 110 | 15 | ≦0.10 |
| Example 5 | Tridecyl phosphite | 0.02 | 15000 | 385 | 80 | 110 | 5 | ≦0.10 |
| Example 6 | Tris (nonylphenyl) phosphite | 0.02 | 15200 | 360 | 95 | 110 | 18 | ≦0.10 |

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A method for producing a molded article having excellent optical characteristics, the quality of said optical characteristics being established by the fact that said article in molded disc form of 1.2 mm thickness and 120 mm in diameter has a retardation of not more than 60 mμ and a warpage of not more than 0.2 mm, comprising: injection molding, at a resin temperature of 330° to 400° C. and at a mold temperature of 50° to 110° C., a resin composition of bis(hydroxyphenyl)alkane polycarbonate having an average molecular weight of 12,000 to 18,000 and containing 0.005 to 0.5 wt. %, based on the polycarbonate resin, of a phosphorous ester of the formula:

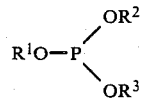

wherein each of $R^1$ and $R^2$ independently is an alkyl or aryl group, and $R^3$ is hydrogen, an alkyl group or aryl group.

2. The method of claim 1, wherein the injection molding is effected at an injection rate of not less than 70 ml/second.

3. The method of claim 1, wherein said injection rate ranges from 80 to 300 ml/second.

4. The method of claim 1, wherein said mold temperature ranges from 60° to 105° C.

5. The method of claim 1, wherein said resin temperature ranges from 335° to 390° C.

* * * * *